United States Patent
Acharya et al.

(10) Patent No.: US 11,618,571 B2
(45) Date of Patent: Apr. 4, 2023

(54) BI-FOLD COMPARTMENT DOOR WITH SPRING ASSIST AND CAM LATCH

(71) Applicant: B/E Aerospace, Inc., Winston-Salem, NC (US)

(72) Inventors: Pradeep Acharya, Bangalore (IN); Sreekanth Koti Ananda Rao, Chikkalasandra (IN); Yashashree Umakant Khachane, Karnataka (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 16 days.

(21) Appl. No.: 17/374,477

(22) Filed: Jul. 13, 2021

(65) Prior Publication Data
US 2022/0194594 A1 Jun. 23, 2022

(30) Foreign Application Priority Data

Dec. 21, 2020 (IN) .............................. 202041055586

(51) Int. Cl.
*B64D 11/06* (2006.01)
*E05D 15/26* (2006.01)

(52) U.S. Cl.
CPC ...... *B64D 11/0627* (2014.12); *B64D 11/0691* (2014.12); *E05D 15/262* (2013.01)

(58) Field of Classification Search
CPC ............ B64D 11/0627; B64D 11/0691; E05D 15/262; E05D 15/264; E05D 15/266
See application file for complete search history.

(56) References Cited

U.S. PATENT DOCUMENTS

| | | | |
|---|---|---|---|
| 2,238,181 A | | 4/1941 | Morgan |
| 3,085,622 A | * | 4/1963 | Burgin .................. E05D 15/262 160/207 |
| 4,088,172 A | * | 5/1978 | Pollock ................. E05D 15/262 160/207 |
| 4,448,232 A | | 5/1984 | McQueen et al. |
| 4,609,027 A | | 9/1986 | Keller |
| 4,637,446 A | | 1/1987 | McQueen et al. |
| 4,799,632 A | * | 1/1989 | Baymak ............. B64D 11/0691 297/14 |

(Continued)

OTHER PUBLICATIONS

Storage Motion Inc., URL: https://storagemotion.com/automaticdoors/, URL: https://www.youtube.com/watch?v=2TYa_UI2UEA, downloaded Oct. 31, 2020.

*Primary Examiner* — Joshua J Michener
*Assistant Examiner* — Ka Chun Leung
(74) *Attorney, Agent, or Firm* — Suiter Swantz pc llo

(57) ABSTRACT

Disclosed is a door assembly for enclosing a compartment, for instance a cabin attendant seat (CAS) compartment. The assembly generally includes spaced guides for guiding opening and closing movement of a bi-fold door including coupled upper and lower door sections. The door sections are coupled through an interface that allows vertical displacement of the lower door section relative to the upper door section when the door assembly is in the closed condition to engage or disengage latches from respective catches. In some embodiments, the assembly further includes cam latches and a biasing mechanism for driving bi-fold door movement toward the open condition, among other features.

19 Claims, 7 Drawing Sheets

(56) References Cited

U.S. PATENT DOCUMENTS

| | | | | |
|---|---|---|---|---|
| 6,056,037 | A * | 5/2000 | Jonkman, Sr. | E05D 15/262 |
| | | | | 49/362 |
| 7,575,037 | B2 | 8/2009 | Jorgensen | |
| 10,633,096 | B1 | 4/2020 | Hoover et al. | |
| 2009/0031635 | A1* | 2/2009 | Davis | E06B 7/16 |
| | | | | 49/478.1 |
| 2017/0074028 | A1* | 3/2017 | Sebastian | E05B 65/0085 |
| 2017/0081904 | A1 | 3/2017 | Morris et al. | |
| 2017/0335611 | A1* | 11/2017 | Brunnmayr | E05F 1/1246 |
| 2019/0380496 | A1* | 12/2019 | Poppenborg | A47B 96/206 |
| 2020/0398989 | A1* | 12/2020 | Marutzky | B64D 11/0691 |

\* cited by examiner

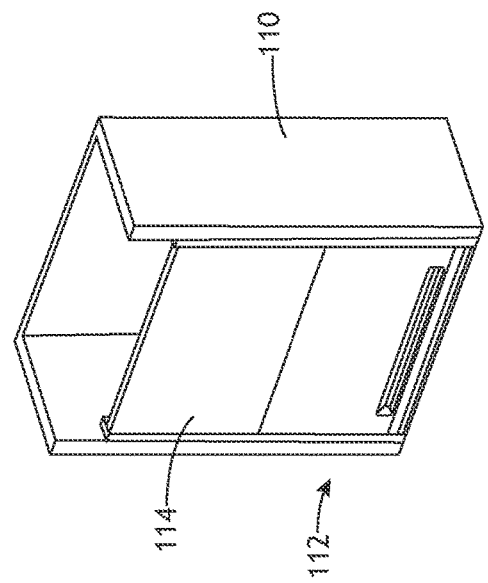
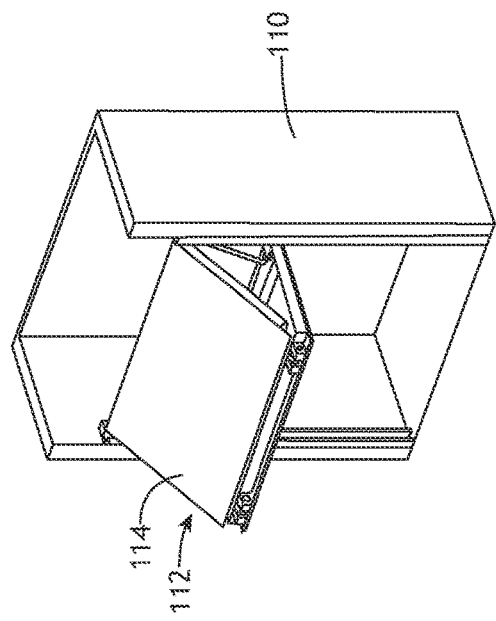
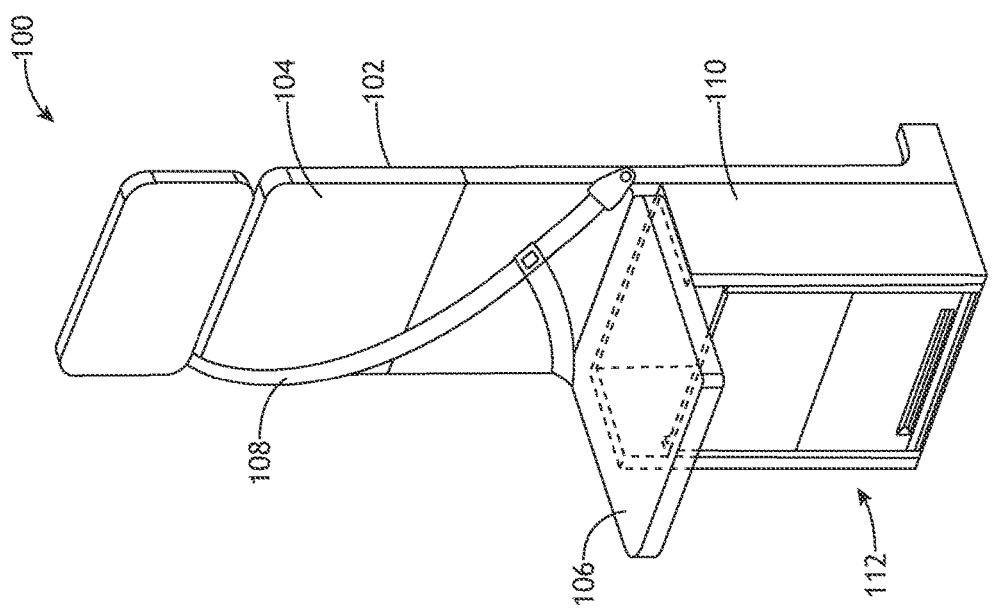

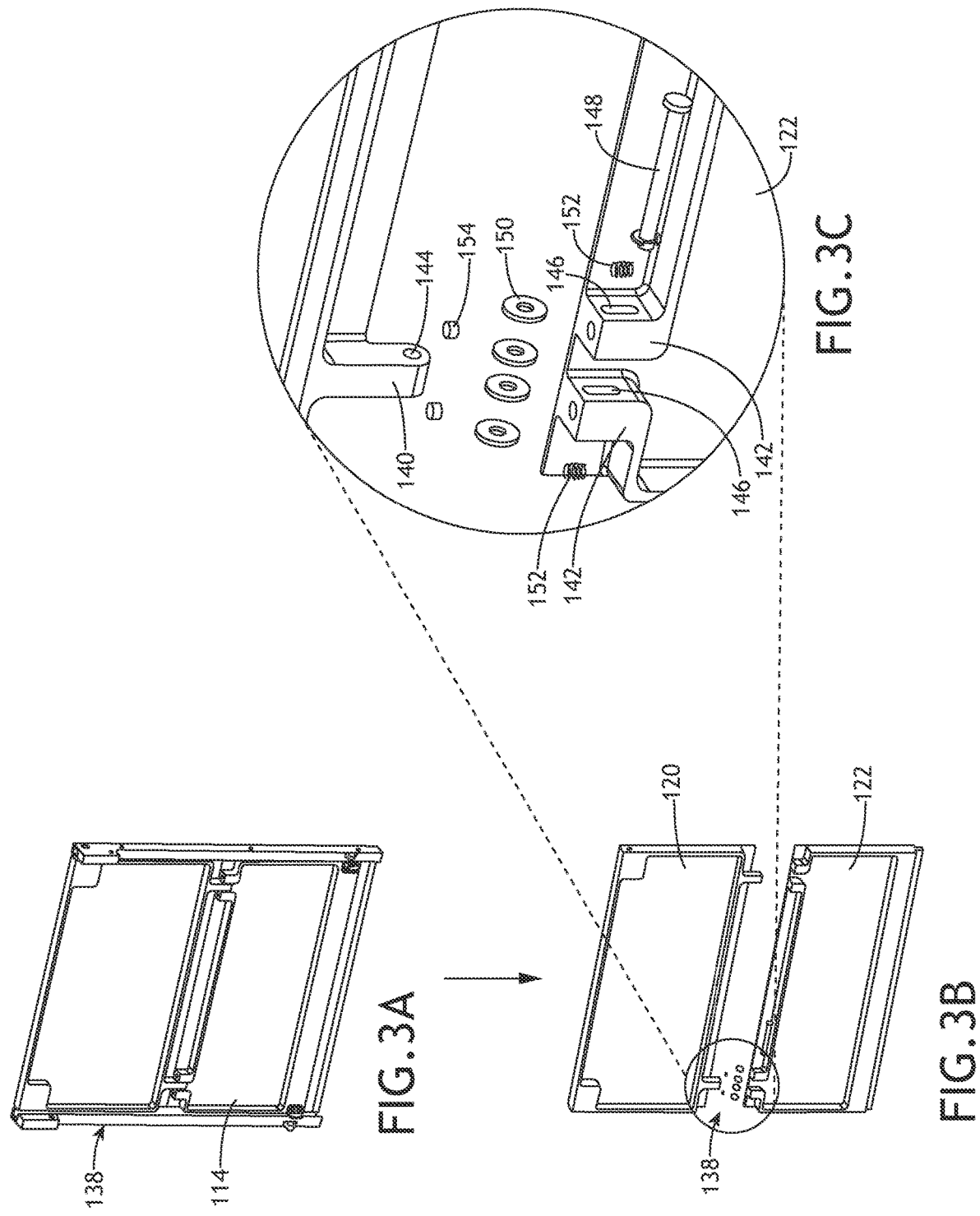

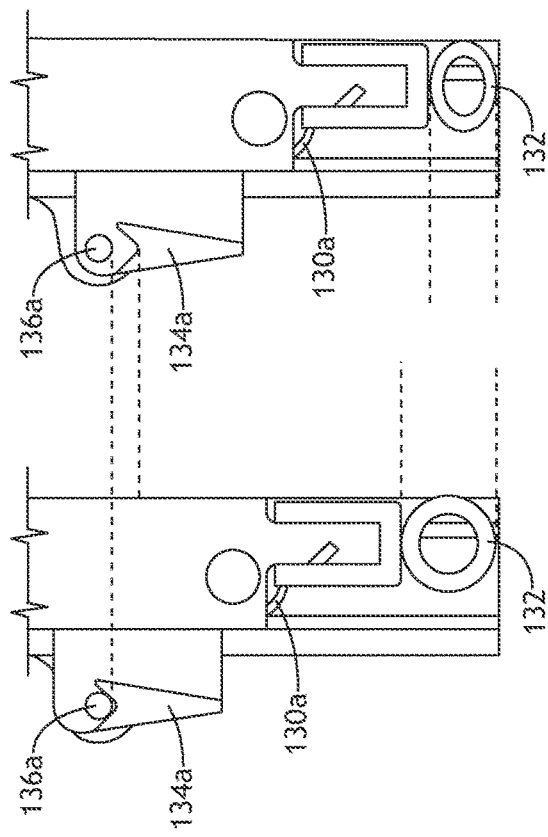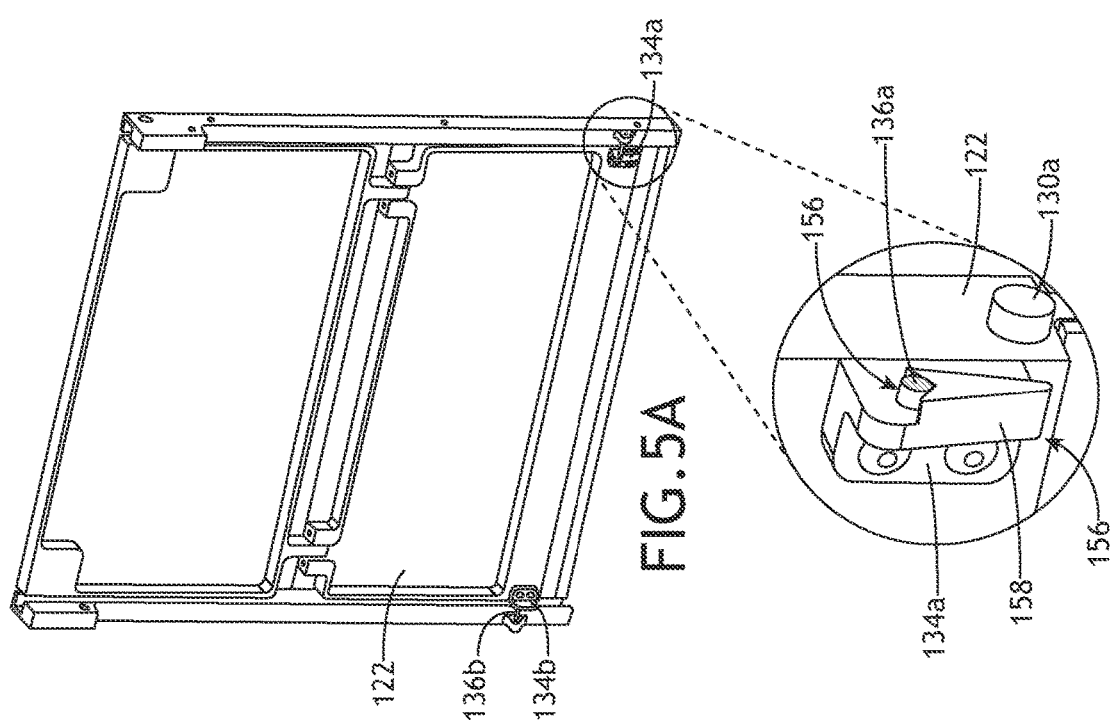

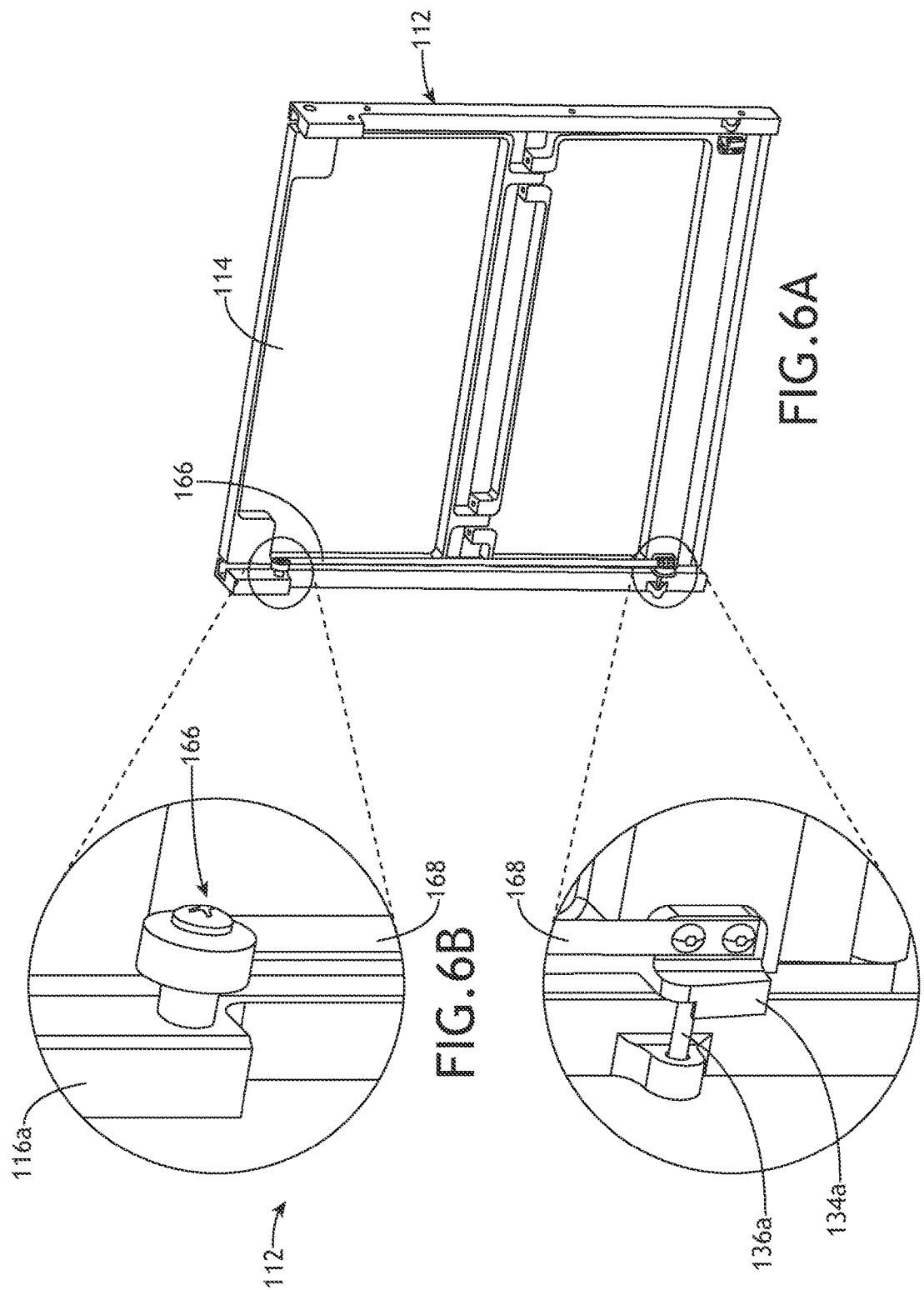

BI-FOLD COMPARTMENT DOOR WITH SPRING ASSIST AND CAM LATCH

TECHNICAL FIELD

The subject matter disclosed herein relates generally to compartment door assemblies, and more particularly to a bi-fold compartment door for a vehicle seat such as an aircraft cabin attendant seat.

BACKGROUND

Vehicle seats such as aircraft cabin attendant seats (CAS) commonly include a compartment positioned below the seat bottom for stowing articles such as oxygen masks, oxygen canisters, fire extinguishers, cable overlength, and personal effects. Access to the compartment interior is typically provided through a door movable between an open condition and a closed condition. Current door configurations include a single elongate door panel hinged along the bottom edge to allow the door to open by rotating downward to a horizontal position proximate the floor, and close by rotating upward to a vertical position against the front face of the compartment.

The open condition of the door proximate the floor and the relatively long length of the single door panel exposes the door and the door hinges to physical abuse and damage from being stepped on and stepped over. Damage to the hinges prevents the door from operating properly and locating the door latch in the corresponding catch to maintain the door in the closed condition. A damaged door must be replaced which increases costs and downtime. In addition, current door latch positions are difficult to access and operate when the seat bottom is deployed to horizontal.

Therefore, what is needed is a new compartment door configuration for vehicle seats that overcomes the disadvantages of current hinged door designs.

BRIEF SUMMARY

To achieve the foregoing, in a first embodiment the present disclosure provides a door assembly including spaced guides and a bi-fold door movably coupled to the spaced guides for vertical movement between a closed condition and an open condition. The bi-fold door includes an upper door section pivotably coupled to the spaced guides and a lower door section slidably coupled to the spaced guides, wherein the lower door section is coupled to the upper door section at an interface allowing vertical translation of the lower door section relative to the upper door section when the bi-fold door is in the closed condition. A latch mechanism includes latches coupled to the lower door section and catches coupled to the spaced guide tracks, wherein the latches engage the catches to maintain the bi-fold door in the closed condition. A first biasing mechanism biases the lower door section toward the upper door section, and a separate, second biasing mechanism biases the bi-fold door toward the open condition.

In some embodiments, the interface includes a first feature having a non-elongate opening, a second feature having an elongate opening, wherein the first feature and the second feature are interleaved such that the non-elongate opening and the elongate opening are horizontally aligned, a hinge pin received through the non-elongate opening and the elongate opening, and a compression spring positioned in the elongate opening interacting with the hinge pin to bias the hinge pin toward one end of the elongate opening.

In some embodiments, the first feature is a projecting feature formed along a bottom of the upper door section, the second feature is a receiving feature formed along a top of the lower door section, and the compression spring is maintained in the elongate opening by a set screw interacting with one end of the compression spring.

In some embodiments, the assembly further includes a compressible bulb seal provided along a length of a bottom of the lower door section.

In some embodiments, each of the latches is a cam latch having opposed ramped surfaces that converge in a direction of a bottom of the lower door section and diverge in a direction of a top of the lower door section, each of the latches forms a catch receiving feature positioned between the divergent ends of the ramped surfaces, and each of the first and second catches is a fixed pin.

In some embodiments, vertically oriented rollers coupled to the lower door section travel along tracks formed in the spaced guides, wherein a diameter of each vertically oriented roller is less than a width of a track formed in the spaced guides such that the lower door section is movable horizontally relative to the spaced guides.

In some embodiments, the second biasing mechanism comprises a constant force spring having a first end coupled to one of the spaced guides and a second end coupled to the lower door section, wherein the constant force spring stores energy as the bi-fold door closes and exerts energy as the bi-fold door opens.

In some embodiments, horizontally aligned stops are positioned along the spaced guides for limiting upward vertical travel of the lower door section along the spaced guides.

In some embodiments, each of the upper and lower door sections is vertically oriented when the bi-fold door is in the closed condition, an angle is formed between the upper and lower door sections when the bi-fold door is in the open condition, and the interface is free of attachment to the spaced guide tracks.

According to another aspect, the present disclosure provides an aircraft cabin attendant seat including a frame supporting a backrest, a seat bottom, and a compartment, and a door assembly enclosing a front opening of the compartment according to the above.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A shows a perspective view of an aircraft CAS including a stowage compartment an door assembly according to an exemplary embodiment of the present disclosure;

FIG. 1B shows a bi-fold door of the door assembly in a closed condition;

FIG. 1C shows the bi-fold door of the door assembly in an open condition;

FIG. 3A shows the door assembly in an assembled state;

FIG. 3B shows the bi-fold door upper and lower door sections in a deconstructed state;

FIG. 3C is a detailed view of FIG. 3B showing the interface between the upper and lower door sections in a deconstructed state;

FIG. 5A shows a perspective view of the door assembly;

FIG. 5B is a detailed view of FIG. 5A showing the cam latch feature of the door assembly;

FIG. 5C is a sectional view of FIG. 5A showing cam latch engagement and disengagement and bulb seal compression;

FIG. 6A is a perspective of the door assembly;

FIG. 6B is a detailed view of FIG. 6A showing constant force spring attachment to the guide track;

FIG. 6C is a detailed view of FIG. 6A showing constant force spring attachment to the cam latch;

DETAILED DESCRIPTION

Figure 2:
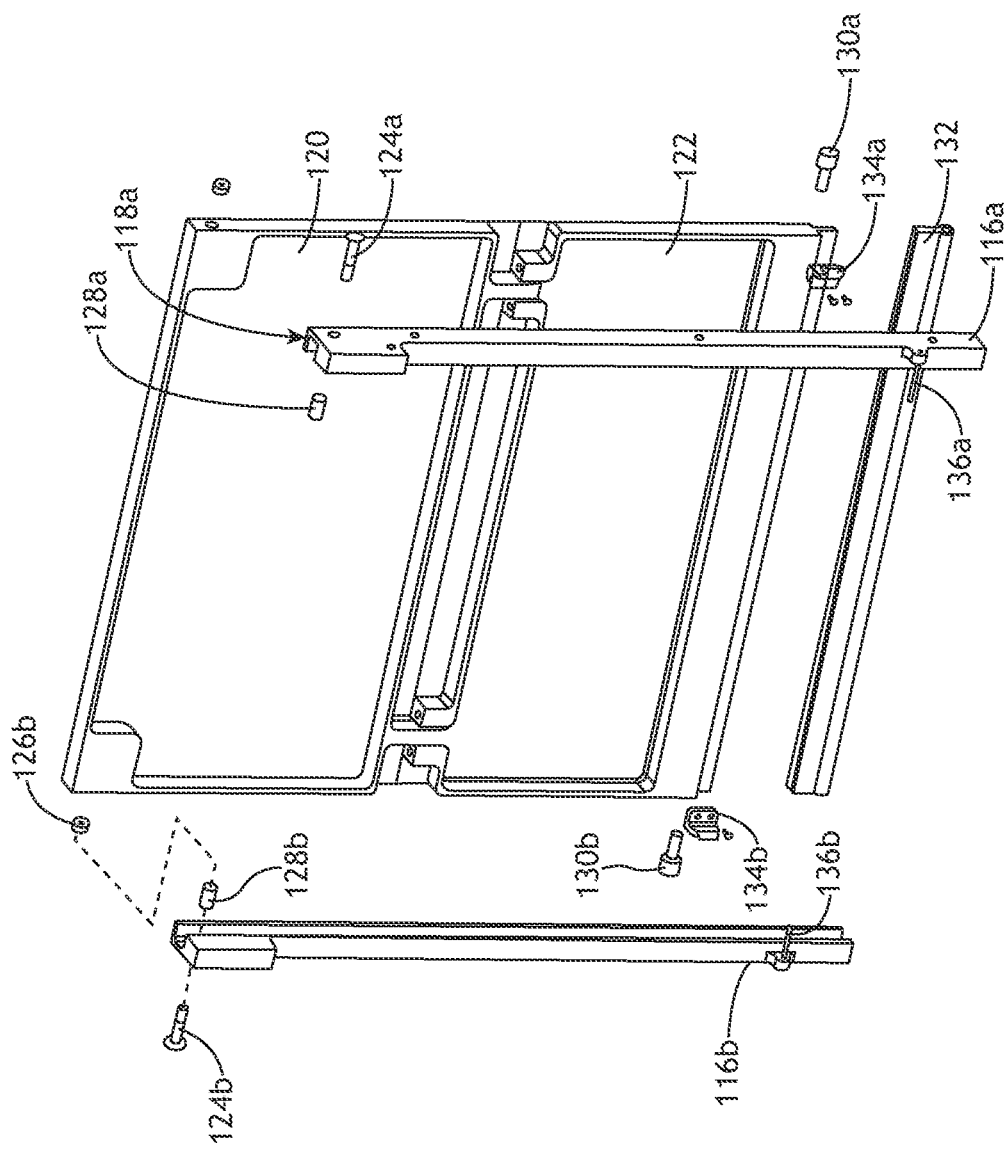
FIG. 2 shows a partially deconstructed view of the door assembly.
Figure 4A:
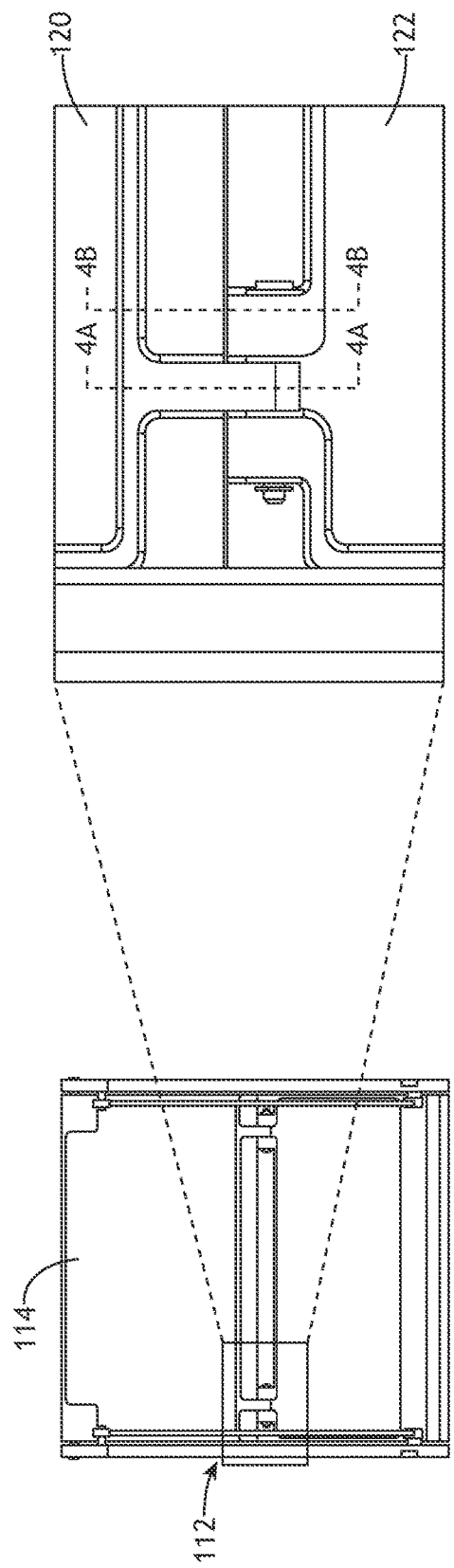
FIG. 4A shows a back view of the door assembly.
Figure 4B:
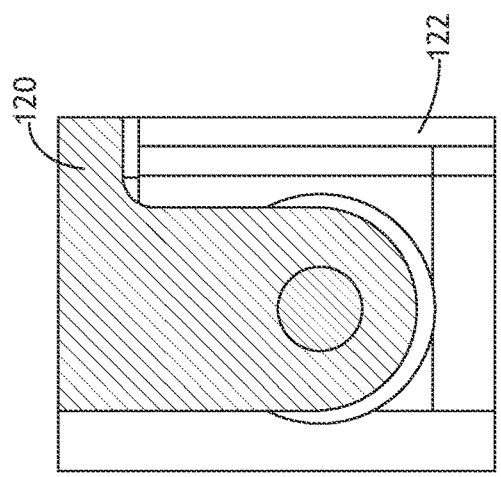
FIG. 4B is a detailed view of FIG. 4A showing the interface of the upper and lower door sections.
Figure 4C:
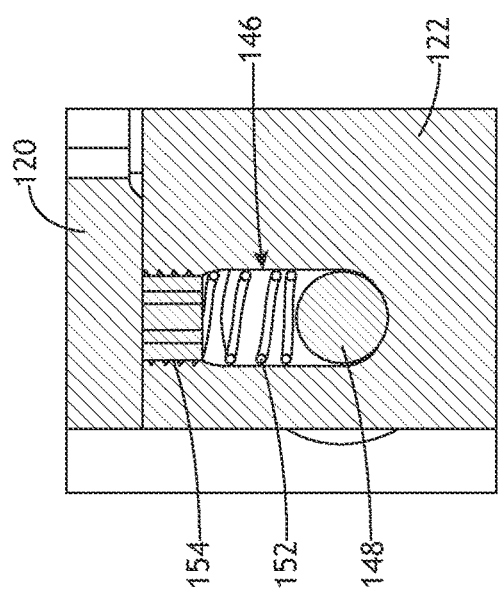
FIG. 4C is a sectional view of FIG. 4B taken along line 4A-4A showing the compression spring biasing the lower door section toward the upper door section.
Figure 4D:
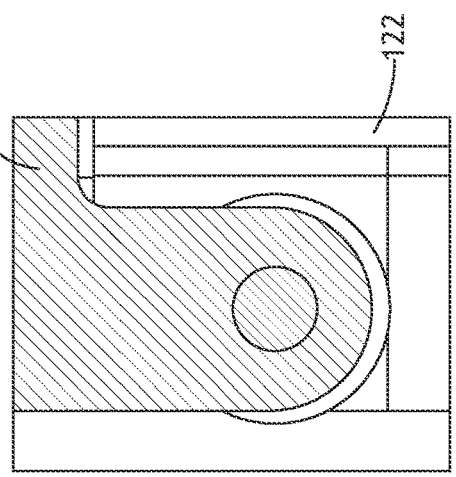
FIG. 4D is a sectional view of FIG. 4B taken along line 4B-4B showing the attachment interface of the upper and lower door sections.

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure describes a bi-fold door assembly for enclosing a space, for instance a compartment associated with a vehicle seat such as a CAS.

With reference to FIGS. 1A-1C, an exemplary embodiment of an aircraft CAS is shown at 100. The CAS 100 generally includes a frame 102 supporting a cushioned backrest 104, a cushioned seat bottom 106, a safety harness 108, and a compartment 110, each being a separate line replaceable unit (LRU) of the CAS 100. In some embodiments, the cushioned seat bottom 106 deploys to a horizontal use position and stows vertically stacked against the cushioned backrest 104 between uses. The compartment 110 may be positioned within or against the frame 102. In some embodiments, the frame 102 defines or forms the compartment 110. In some embodiments, the compartment 110 has a closed back, bottom and opposing sides, and an open front to provide access to an interior volume for stowing articles therein such as oxygen masks and equipment, fire extinguishers, cable overlength, and personal effects. A door assembly 112 according to the present disclosure serves to enclose the front opening of the compartment 110. FIGS. 1A and 1B show the bi-fold door 114 of the door assembly 112 in a closed condition. FIG. 1C shows the bi-fold door 114 of the door assembly 112 in an open condition.

With reference to FIG. 2, spaced guides 116a, 116b support the bi-fold door 114 for guiding movement between the open and closed conditions. In some embodiments, each guide 116a, 116b is an elongate member forming an elongate vertical track 118a, 118b. In some embodiments, the guides 116a, 116b mount inside the compartment proximate the front opening such that the vertical tracks 118a, 118b face each other. In an alternative embodiment, the guides 116a, 116b may mount external to the compartment, for instance proximate or against the front face of the compartment.

The bi-fold door 114 generally includes an upper door section 120 and a lower door section 122 coupled by an interface providing relative folding motion and vertical translation of the lower door section 122 relative to the upper door section 120. In some embodiments, each of the upper and lower door sections 120, 122 is a generally planar member. The upper door section 120 is pivotably coupled to the guides 116a, 116b proximate the top to permit the upper door section to pivot relative to the guides between the open and closed conditions. In some embodiments, the upper door section 120 pivots about screws 124a, 124b or other shafts received through the guides while bushings 126a, 126b and spacers 128a, 128b facilitate pivoting motion while keeping the upper door section centered between the guides 116a, 116b. The lower door section 122 slidably engages the guides 116a, 116b such that the lower door section travels along a portion of the length of the guides while rotating. Vertically oriented rollers 130a, 130b positioned on opposing sides of the lower door section 122 guide motion of the bottom of the lower door section along the vertical tracks 118a, 118b. An elongate bulb seal 132 attached along the bottom edge of the lower door section 122 forms a sealing interface between the lower door section and compartment bottom, frame member or floor when the bi-fold door is in the closed condition. Latches 134a, 134b interact with catches 136a, 136b to maintain the bi-fold door 114 in the closed condition, as discussed further below.

With reference to FIGS. 3A-3C, the upper door section 120 and the lower door section 122 are coupled at an interface 138 that further permits vertical translation of the lower door section 122 relative to the upper door section 120 when the bi-fold door 114 is in the closed condition. As shown, the upper and lower door sections 120, 122 are coupled at symmetrically positioned mating interfaces each including a first projecting feature 140 formed along the bottom end of the upper door section 120 interleaved with second receiving features 142 formed along the top end of the lower door section 122. A non-elongate opening 144 formed through the first projecting feature 140 aligns horizontally with elongate openings 146 formed through the second receiving features 142. A hinge pin 148, for instance a clevis pin, received through each of the elongate openings 146 and non-elongate opening 144 serves to couple the upper and lower door section 120, 122. In some embodiments, washers 150 are positioned at the interface between the interleaved features 140, 142 and the hinge pin 148 and receiving features 142. Compression springs 152 positioned in the elongate openings 146 interact with the hinge pin 148 to bias the lower door section 122 toward the upper door section 120, as discussed further below. Set screws 154 maintain the compression springs 152 in their respective openings and serve to adjust compression.

With reference to FIGS. 4A-4D, the elongate (e.g., oblong) openings 146 formed in the lower door section 122 permit vertical translation of the lower door section 122 relative to the upper door section 120. In use, when the bi-fold door 114 is in the closed condition, the lower door section 122 can be pulled downward away from upper door section 120 against the force of the compression springs 152, and while the bulb seal compresses, to engage or release the latches from their respective catches. The pivotal attachment of the upper door section 120 to the guides 116a, 116b prevents vertical translation of the upper door section, and the non-elongate openings formed through the projecting features 140 of the upper door section 120 prevent hinge pin translation relative to the upper door section 120. As such, when the bi-fold door 114 in the closed condition, the upper door section 120 and the hinge pin 158 are constrained against vertical translation while the lower door section 122 is pulled downward to engage the catches in the latches or disengage the latches from the catches.

With reference to FIGS. 5A-5C, in some embodiments, the latches 134a, 134b and corresponding catches 136a, 136b are symmetrically positioned proximate the left and right sides of the door assembly 112. In some embodiments, the latches 134a, 134b are coupled to the back of the lower door section 122 and the catches 136a, 136b are coupled to the guides 116a, 116b. In some embodiments, the catches 136a, 136b may be fixed dowel pins. As shown, each latch 134a, 134b includes a cam feature 156 having opposed ramped surfaces 158 that converge in a direction of the bottom of the lower door section 122 and diverge in a direction of the top of the lower door section. A catch receiving feature 162 formed at, for instance between, the divergent ends of the ramped surfaces serves to locate and retain the respective catch 136a, 136b in the latch to maintain the bi-fold door 114 in the closed condition.

In use, to latch the bi-fold door 114 in the closed condition, the cam features of the latches 134a, 134b drive the lower door section 122 inward or outward horizontally upon engagement with the catches 136a, 136b such that the latches can move vertically past the catches to locate the catches in their respective catch receiving feature. The diameter of each vertically oriented roller 130a, 130b is less than the track width by an amount sufficient to permit the lower door section 122 to move horizontally to clear the catches 136a, 136b as the latches 134a, 134b moves past in the vertical direction. In use, the bulb seal 132 compresses by an amount sufficient to pull the lower door section 122 downward vertically to clear the latches 134a, 134b of their catches 136a, 136b, as best shown in FIG. 5C. When latched closed, the lower door section 122 may be partially vertically displaced relative to the upper door section 120 while the force of the compression springs 152 serves to urge the latches 134a, 134b upward against their respective catches 136a, 136b.

With reference to FIGS. 6A-6C, whereas the compression springs 152 discussed above function as a first biasing mechanism to bias the lower door section toward the upper door section 120 to provide biasing force to maintain the closed condition, a second biasing mechanism implemented as constant force springs bias the bi-fold door 114 upward to maintain the open condition. Like the catch and latch mechanisms, the second biasing mechanisms may be symmetrically positioned proximate the left and right sides of the assembly. In some embodiments, each biasing mechanism includes a constant force spring 166 having a first end coupled to one of the guides 116a and a second end coupled to the lower door section 122, for instance attached to the latch 134a.

Figure 7A:
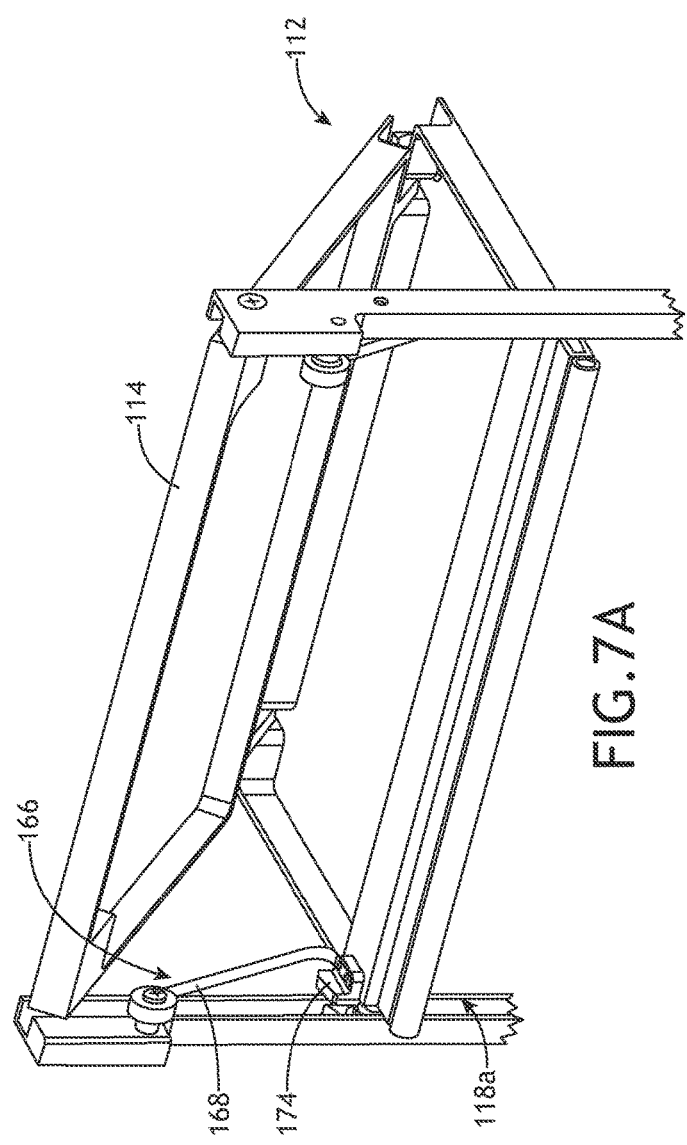
FIG. 7A shows a perspective view of the bi-fold door in an open condition.
Figure 7C:
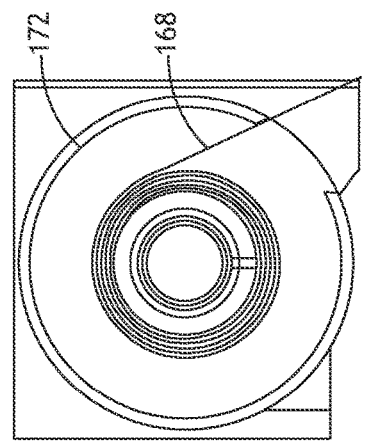
FIG. 7C shows a portion of the constant force spring in a coiled condition corresponding to an open condition of the bi-fold door.
Figure 7B:
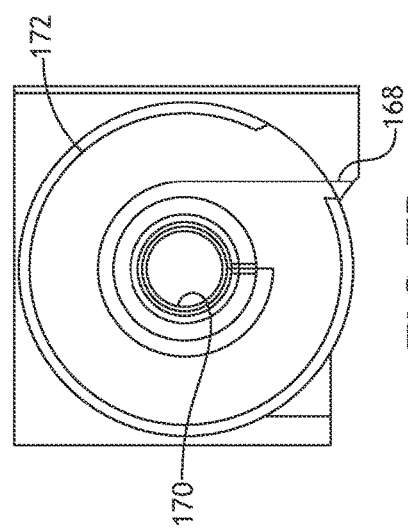
FIG. 7B shows a portion of the constant force spring in an un-coiled condition corresponding to a closed condition of the bi-fold door.

With further reference to FIGS. 7A-7C, in some embodiments, each constant force spring 166 includes a prestressed strip of flat spring material 168 which coils around a shaft 170 and itself within a hollow cylindrical casing 172. As the bi-fold door 114 is moved toward the closed position the spring 166 is pulled and straightened thereby storing energy. When the bi-fold door 114 is unlatched and released, the tendency of the spring 166 to return to its original radius exerts an upward pulling force on the lower door section 122 driving the bi-fold door toward the open condition and maintaining the open condition. To close the bi-fold door 114, the lower door section 122 is pulled downward against the force of the springs 166. Horizontally aligned stops 174 positioned along the vertical tracks 118a limit the upward travel of the lower door section 122. As the bi-fold door 114 transitions from fully closed to fully open, an angle forms between the upper and lower door sections 120, 122 and the stops determine the resulting angle therebetween. In some embodiments, in the fully open condition the lower door section 122 is substantially horizontal and the upper door section 120 is at an angle to horizontal.

In use, to open the closed door, the lower door section is moved downward (e.g., pulled or pushed) to compress the bulb seal to disengage the latches from the catches. The elongate features permit the lower door section to translate vertically downward relative to the upper door section. The constant force springs spool in their casings to pull the door upwards. The two door sections move upwards and fold over at the hinge interface, with the upward motion assisted by the rollers. Upward movement of the door sections is limited by the features provided in the tracks. The constant force springs hold the door in the open condition. The door is closed by the reverse sequence.

The door assembly described herein can be used to enclose a compartment associated with an aircraft CAS, pilot seat, or any other vehicle seat. The door assembly can be further implemented in an aircraft cabin or cockpit environment to enclose any compartment benefitting from a bi-fold door. The door assembly can be further implemented in any application benefitting from a bi-fold door.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A door assembly for a compartment, comprising:
   spaced guides;
   a bi-fold door movably coupled to the spaced guides for vertical movement between a closed condition and an open condition, the bi-fold door including an upper door section pivotably coupled to the spaced guides and a lower door section slidably coupled to the spaced guides, wherein the lower door section is coupled to the upper door section at an interface allowing vertical translation of the lower door section relative to the upper door section when the bi-fold door is in the closed condition;
   a latch mechanism including latches coupled to the lower door section and catches coupled to the spaced guide tracks, wherein the latches engage the catches to maintain the bi-fold door in the closed condition;
   a first biasing mechanism for biasing the lower door section toward the upper door section; and
   a second biasing mechanism for biasing the bi-fold door toward the open condition;
   wherein the interface comprises:
     a first feature having a non-elongate opening;
     a second feature having an elongate opening, wherein the first feature and the second feature are interleaved such that the non-elongate opening and the elongate opening are horizontally aligned;
     a hinge pin received through the non-elongate opening and the elongate opening; and
     a compression spring positioned in the elongate opening interacting with the hinge pin to bias the hinge pin toward one end of the elongate opening.

2. The door assembly according to claim 1, wherein:
   the first feature is a projecting feature formed along a bottom of the upper door section;
   the second feature is a receiving feature formed along a top of the lower door section; and
   the compression spring is maintained in the elongate opening by a set screw interacting with one end of the compression spring.

3. The door assembly according to claim 1, further comprising a compressible bulb seal provided along a length of a bottom of the lower door section.

4. The door assembly according to claim 1, wherein:
   each of the latches is a cam latch having opposed ramped surfaces that converge in a direction of a bottom of the lower door section and diverge in a direction of a top of the lower door section;
   each of the latches forms a catch receiving feature positioned between the divergent ends of the ramped surfaces; and
   each of the first and second catches is a fixed pin.

5. The door assembly according to claim 1, further comprising vertically oriented rollers coupled to the lower door section engaged to travel along tracks formed in the spaced guides, wherein a diameter of each vertically oriented roller is less than a width of a track formed in the spaced guides such that the lower door section is movable horizontally relative to the spaced guides.

6. The door assembly according to claim 1, wherein the second biasing mechanism comprises a constant force spring having a first end coupled to one of the spaced guides and a second end coupled to the lower door section, wherein the constant force spring stores energy as the bi-fold door closes and exerts energy as the bi-fold door opens.

7. The door assembly according to claim 1, further comprising stops positioned along the spaced guides limiting upward vertical travel of the lower door section along the spaced guides.

8. The door assembly according to claim 1, wherein:
   each of the upper and lower door sections is vertically oriented when the bi-fold door is in the closed condition;
   an angle is formed between the upper and lower door sections when the bi-fold door is in the open condition; and
   the interface is free of attachment to the spaced guide tracks.

9. An aircraft cabin attendant seat (CAS), comprising:
   a frame supporting a backrest, a seat bottom, and a compartment; and
   a door assembly enclosing a front opening of the compartment, the door assembly comprising:
     spaced guides mounted to the compartment;
     a bi-fold door movably coupled to the spaced guides for vertical movement between a closed condition and an open condition, the bi-fold door including an upper door section pivotably coupled to the spaced guides and a lower door section slidably coupled to the spaced guides, wherein the lower door section is coupled to the upper door section at an interface allowing vertical translation of the lower door section relative to the upper door section when the bi-fold door is in the closed condition;
     a latch mechanism including latches coupled to the lower door section and catches coupled to the spaced guide tracks, wherein the latches engage the catches to maintain the bi-fold door in the closed condition;
     a first biasing mechanism for biasing the lower door section toward the upper door section; and
     a second biasing mechanism for biasing the bi-fold door toward the open condition;

wherein the interface comprises:
a first feature having a non-elongate opening;
a second feature having an elongate opening, wherein the first feature and the second feature are interleaved such that the non-elongate opening and the elongate opening are horizontally aligned;
a hinge pin received through the non-elongate opening and the elongate opening; and
a compression spring positioned in the elongate opening interacting with the hinge pin to bias the hinge pin toward one end of the elongate opening.

10. The CAS according to claim 9, wherein:
the first feature is a projecting feature formed along a bottom of the upper door section;
the second feature is a receiving feature formed along a top of the lower door section; and
the compression spring is maintained in the elongate opening by a set screw interacting with one end of the compression spring.

11. The CAS according to claim 9, further comprising a compressible bulb seal provided along a length of a bottom of the lower door section.

12. The CAS according to claim 9, wherein:
each of the latches is a cam latch having opposed ramped surfaces that converge in a direction of a bottom of the lower door section and diverge in a direction of a top of the lower door section;
each of the latches forms a catch receiving feature positioned between the divergent ends of the ramped surfaces; and
each of the first and second catches is a fixed pin.

13. The CAS according to claim 9, further comprising vertically oriented rollers coupled to the lower door section engaged to travel along tracks formed in the spaced guides, wherein a diameter of each vertically oriented roller is less than a width of a track formed in the spaced guides such that the lower door section is movable horizontally relative to the spaced guides.

14. The CAS according to claim 9, wherein the second biasing mechanism comprises a constant force spring having a first end coupled to one of the spaced guides and a second end coupled to the lower door section, wherein the constant force spring stores energy as the bi-fold door closes and exerts energy as the bi-fold door opens.

15. The CAS according to claim 9, further comprising stops positioned along the spaced guides limiting upward vertical travel of the lower door section along the spaced guides.

16. The CAS according to claim 9, wherein:
each of the upper and lower door sections is vertically oriented when the bi-fold door is in the closed condition;
an angle is formed between the upper and lower door sections when the bi-fold door is in the open condition; and
the interface is free of attachment to the spaced guide tracks.

17. The CAS according to claim 9, wherein the compartment is positioned below the seat bottom.

18. The CAS according to claim 9, wherein the compartment comprises a closed back, a closed bottom, closed sides, and an open top.

19. A door assembly for a compartment, comprising:
spaced guides;
a bi-fold door movably coupled to the spaced guides for vertical movement between a closed condition and an open condition, the bi-fold door including an upper door section pivotably coupled to the spaced guides and a lower door section slidably coupled to the spaced guides, wherein the lower door section is coupled to the upper door section at an interface allowing vertical translation of the lower door section relative to the upper door section when the bi-fold door is in the closed condition;
a latch mechanism including latches coupled to the lower door section and catches coupled to the spaced guide tracks, wherein the latches engage the catches to maintain the bi-fold door in the closed condition, wherein each of the latches is a cam latch having opposed ramped surfaces that converge in a direction of a bottom of the lower door section and diverge in a direction of a top of the lower door section, each of the latches forms a catch receiving feature positioned between the divergent ends of the ramped surfaces, and each of the first and second catches is a fixed pin;
a first biasing mechanism for biasing the lower door section toward the upper door section; and
a second biasing mechanism for biasing the bi-fold door toward the open condition.

* * * * *